(12) United States Patent
Radulescu

(10) Patent No.: US 6,467,517 B1
(45) Date of Patent: Oct. 22, 2002

(54) TIRE HAVING SACRIFICIAL BRIDGING

(75) Inventor: Robert Ciprian Radulescu, Perignat les Sarlieve (FR)

(73) Assignee: Michelin Recherche et Technique S.A., Route Louis-Braille (CH)

( * ) Notice: Subject to any disclaimer, the term of this patent is extended or adjusted under 35 U.S.C. 154(b) by 0 days.

(21) Appl. No.: 09/490,036

(22) Filed: Jan. 21, 2000

Related U.S. Application Data

(63) Continuation-in-part of application No. 09/098,395, filed as application No. PCT/US99/13687 on Jun. 15, 1999, now Pat. No. 6,102,092.

(51) Int. Cl.⁷ .......................... B60C 11/04; B60C 11/12; B60C 11/13; B60C 103/00
(52) U.S. Cl. .............................. 152/209.2; 152/209.18; 152/209.19; 152/209.23; 152/209.24; 152/DIG. 3
(58) Field of Search .................... 152/209.2, 209.18, 152/209.19, 209.22, 209.23, DIG. 3, 901, 209.24

(56) References Cited

U.S. PATENT DOCUMENTS

| | | | |
|---|---|---|---|
| 2,926,715 A | 3/1960 | Constantakis | 152/209 |
| 4,217,942 A | 8/1980 | Takigawa | 152/209 R |
| 4,298,046 A | 11/1981 | Herbelleau | 152/209 R |
| 4,353,402 A * | 10/1982 | Burche et al. | 152/DIG. 3 |
| 4,412,575 A | 11/1983 | Maeda | 152/209 R |
| 4,945,966 A | 8/1990 | Ogawa | 152/209 R |
| 5,024,260 A | 6/1991 | Ochiai | 152/209 R |
| 5,180,453 A | 1/1993 | Fukasawa | 152/209 R |
| 5,385,189 A | 1/1995 | Aoki | 152/209 R |
| 5,580,404 A * | 12/1996 | Hitzky | 152/DIG. 3 |
| 5,665,184 A | 9/1997 | Fukumoto | 152/209 R |
| 5,783,002 A * | 7/1998 | Lagnier | 152/DIG. 3 |
| 5,795,415 A | 8/1998 | Campana | 152/209 R |
| 5,896,905 A | 4/1999 | Lurois | 152/209.23 |
| 6,102,092 A * | 8/2000 | Radulescu | 152/DIG. 3 |

FOREIGN PATENT DOCUMENTS

| | | | | |
|---|---|---|---|---|
| DE | 4107547 | * | 9/1991 | 152/DIG. 3 |
| EP | 0 397 639 A1 | | 11/1990 | B60C/11/01 |
| EP | 810104 | * | 12/1997 | 152/209.23 |
| GB | 474 588 | | 11/1937 | |
| GB | 2 053 783 A | | 2/1981 | B29H/5/02 |
| GB | 2 093 777 A | | 9/1982 | B60C/11/08 |
| JP | 62 006802 | | 6/1987 | B60C/11/06 |
| JP | 2-114006 | | 4/1990 | B60C/11/11 |
| JP | 2-293204 | | 12/1990 | B60C/11/11 |
| JP | 92-310109 | | 12/1990 | B60C/11/12 |
| JP | 3-153404 | | 7/1991 | B60C/11/08 |
| JP | 5-201205 | * | 8/1993 | |
| JP | 3-338418 | | 12/1993 | B60C/11/12 |
| JP | 3-345505 | | 12/1993 | B60C/11/12 |
| WO | WO 96/01189 | * | 1/1996 | |

* cited by examiner

Primary Examiner—Steven D. Maki
(74) Attorney, Agent, or Firm—Martin Remickl; Alan Csontos; Martin Farrell

(57) ABSTRACT

The present invention provides a pneumatic tire having a tread portion comprising a plurality of axially spaced apart essentially longitudinal grooves separating essentially longitudinal ribs. On at least one of said ribs, transverse grooves or cuts repeat in the circumferential direction to form first and second land portions wherein the first land portions comprise blocks having a circumferential length greater than that of the second land portions. Said second land portion acts as a sacrificial bridge which provides traction improvement and minimizes undesirable surface anomalies during the service life of the tire.

10 Claims, 13 Drawing Sheets

TIRE HAVING SACRIFICIAL BRIDGING

This application is a continuation-in-part of non-provisional U.S. application No. 09/098,395, filed Jun. 17, 1998, now issued as U.S. Pat. No. 6,102,092, and is a continuation of PCT application PCT/US99/13607, filed Jun. 15, 1999, published in the English language as WO99/65814.

BACKGROUND OF THE INVENTION

1. Field of the Invention

The present invention relates to a radial pneumatic vehicle tire for which tread surface anomalies causing user dissatisfaction are diminished without decrease in tire performance such as wet traction and braking performance. More specifically, the invention relates to a pneumatic tire having a plurality of axially spaced apart essentially longitudinal grooves separating essentially longitudinal ribs. On at least one of said ribs, transverse grooves or cuts repeat in the circumferential direction to form first and second land portions wherein the first land portions comprise blocks having a circumferential length greater than that of the second land portions.

2. Description of Related Art

In order to improve the wet traction, wet grip, braking performance and the like, radial pneumatic tires have treads with longitudinal or zigzag grooves extending in the circumferential direction, and, for further traction improvement, transverse grooves axially connecting the circumferential grooves to form blocks. To maintain a good level of traction performance, the transverse grooves or cuts need to be present throughout the service life of the tire tread. Unfortunately, to achieve this the tire must have transverse grooves whose depth is substantially equal to the depth of the longitudinal grooves. An example of such a reference tire 100 is shown in FIGS. 1a and 1b, respectively, in a full tire view and a plan view of the tread portion of the tire. In this example the tread blocks 20 are circumferentially spaced apart by the substantially full depth transverse grooves 30. Tire treads so designed are commonly used on the drive axle of vehicles and have acceptable wet traction performance, but are known to have reduced tread rigidity resulting in the formation of tread surface anomalies such as a "heel-and-toe" or "sawtooth" profile or tread block depression. These anomalies result in user dissatisfaction due to either unacceptable visual appearance of the tire or ride discomfort caused by tread induced vibrations. Either factor can cause removal of the tire from service prior to delivering its full potential tread service to the user.

To achieve some kind of compromise between ace anomalies and traction performance, tires have been designed having transverse grooves defining blocks 20 where the transverse grooves 30 have a depth d substantially less than the depth h of the longitudinal grooves, an example of which is tire 200 shown in FIG. 2a. The land portions of the tread bounded by edge 22 of a first block 20 and by edge 21 of a second block 20 are commonly referred to as "bridges". For values of d/h near zero, tires will have poor traction, and for values of d/h approaching unity, tires may develop surface anomalies leading to reduced service life of the original tread. An acceptable result can be obtained when the tire tread is designed so that the ratio $R_1 = d/h$ of groove depth d to the tread depth h is such that d/h is between about 0.1:1 to about 0.2:1. Unfortunately, tires experience a loss of tread rubber due to factors such as abrasion, fatigue and the like during their service lives. As a result, tires having tread designs such as shown in FIG. 2a, that is with shallow transverse grooves, will wear in such a manner that the ratio d/h will continually decrease and eventually approach a value of zero. The disadvantage of such a tire wherein d/h approaches zero is the aforementioned loss of wet grip, braking performance and the like.

Tests under highway use conditions were conducted on tires such as tire 200 having a new tire tread depth of approximately 20.5 mm with transverse grooves approximately 3 mm deep. The evolution of d/h just described is demonstrated by the test results shown in FIG. 2b which shows the measured tread depth versus circumferential position for a section of the tire. After 54,000 kilometers of service the tread depth has reached an approximate value of 17 mm everywhere, and the ratio of d/h is approximately zero. In this case the tires are more often removed from service for a perceived loss of traction rather than for the onset of surface anomalies. In an effort to mitigate this counterperformance, tire designers often add additional siping or employ complex block geometry which, instead of improving the situation, may further generate surface anomalies and/or sensitivity to chipping or tearing. Thus a tire tread design that maintains the optimum value of the ratio d/h throughout the service life of the tread is needed.

SUMMARY OF THE INVENTION

An object of the present invention is to provide an improved radial pneumatic tire which maintains good wet traction performance and is free of surface anomalies. This object is obtained by a tread portion of the tire having a plurality of longitudinal grooves which form ribs and at least one of those ribs being transected by narrow transverse groove or cuts which form alternating land portions wherein the first land portions are longer than the second land portions.

According to the notation shown in FIG. 3b for tire 300, the first land portion will hereafter be referred to as block 20 and the second land portion as sacrificial bridge 30. An object of the invention is to maintain a non-zero value of the ratio $R_1 = d/h$. To accomplish this object, the sacrificial bridge must be decoupled from the adjacent tread blocks 20. This decoupling can be achieved by narrow transverse grooves or cuts 40 and 50. Cut 40 is located between the trailing edge 22 of a first of blocks 20 and a leading edge 31 of the sacrificial bridge 30. Cut 50 is located between the trailing edge 32 of the sacrificial bridge 30 and the leading edge 21 of a second of blocks 20. Leading and trailing edges are defined relative to the rolling direction of the tire with the leading edge 21 being the first point on block 20 to engage the ground during rolling of the tire and the trailing edge 22 being the last point on block 20 to engage the ground during rolling of the tire. The sacrificial bridge 30 is bounded in its circumferential extent by cuts 40 and 50 and in its lateral extent by circumferential grooves 10. The depth $h_1$ of the cuts 40 and 50 and the height $h_2$ of the sacrificial bridge 30 are such that the surface 33 of the sacrificial bridge 30 contacts the ground during rolling of the tire under load. An example of such a design is the tire 300 shown in plan view in FIG. 3a.

Since the surface 33 contacts the ground when rolling under load, the sacrificial bridge 30 will be subjected to longitudinal shearing forces during the period of ground contact. This shearing force must be sufficient to generate a rate of rubber loss (measured in mm/km) from the sacrificial bridge such that the ratio d/h is maintained. In order to solve the problems found in reference tires, the inventor has found that an optimum level of shearing force, and thus, rate of rubber loss will be obtained only for certain ranges of the values of $R_1=d/h$, $R_2=h_1/h$, and the ratio of sacrificial bridge length $L_2$ to block length $L_1$, $R_3=L_2/L_1$. When these parameters are in their respective optimum ranges will the ratio d/h be maintained throughout the service life of the tread.

BRIEF DESCRIPTION OF THE DRAWINGS

The invention and embodiments will be described with reference to the accompanying drawings, wherein:

FIG. 1b is a plan view of the tread portion of the reference pneumatic radial tire 100 shown in FIG. 1a.

FIG. 2b is a cross sectional view of the tread portion of the reference pneumatic radial tire 200 as shown in FIG. 2a.

FIG. 2c is a graphical plot of tread depth vs. circumferential position around a tire having the tread portion shown in FIG. 2a.

DETAILED DESCRIPTION OF THE PREFERRED EMBODIMENTS

Figure 1A:
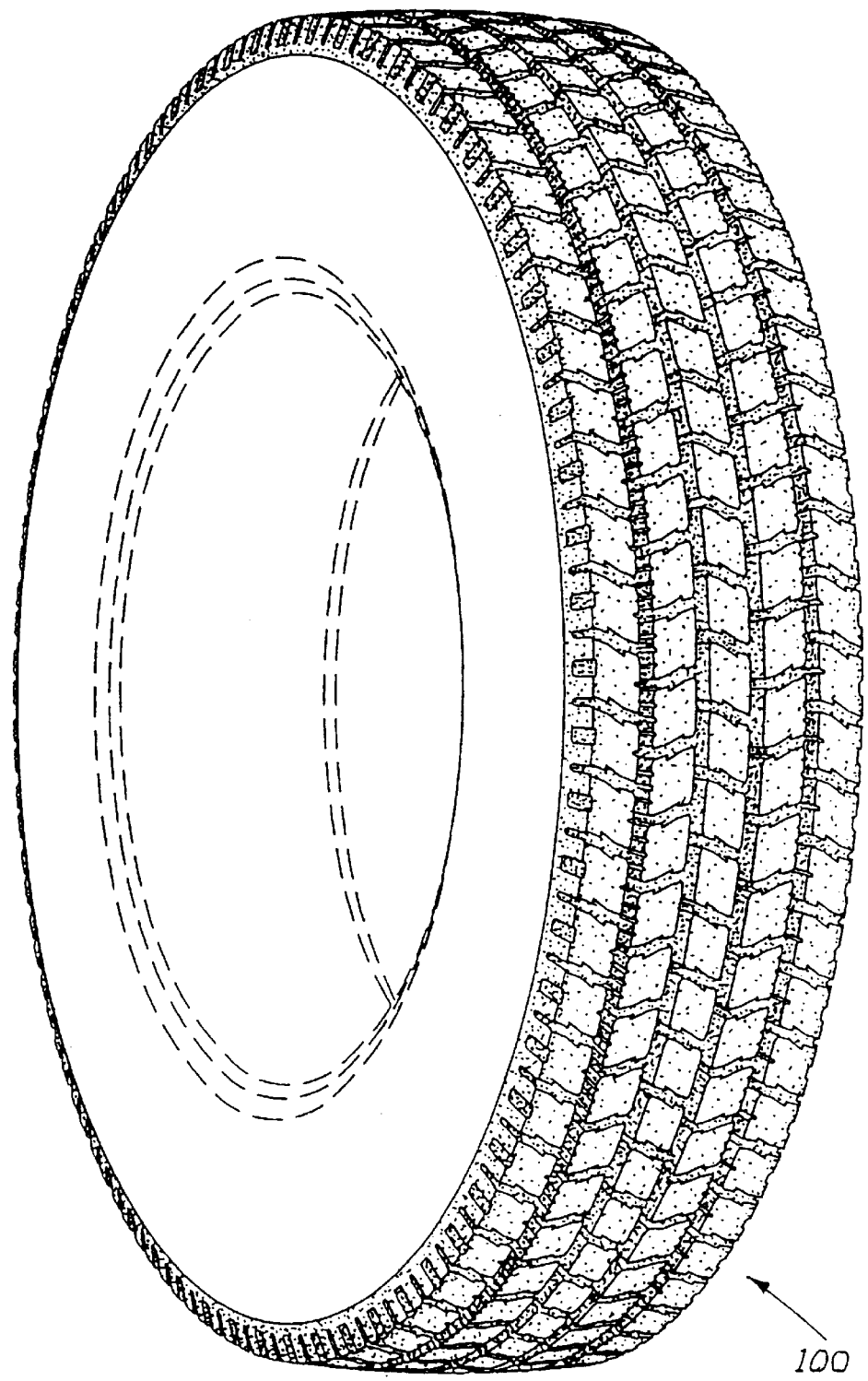
FIG. 1a is a partial perspective view of a reference pneumatic radial tire 100 having full depth transverse grooves.
Figure 1B:
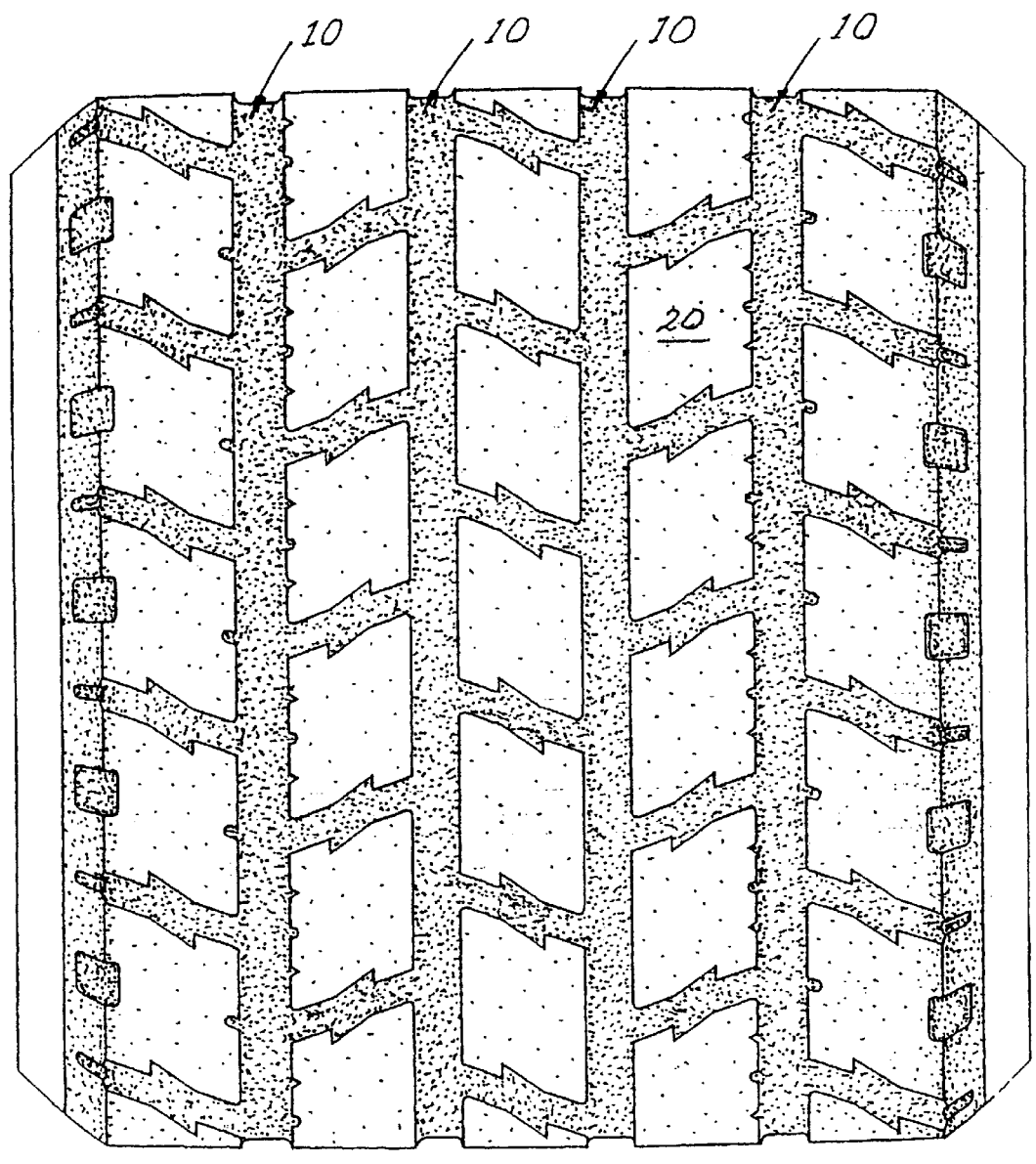

When a block type tire is operated on a vehicle during highway use, surface shearing stresses are developed at the tire-road interface due the flattening of the tire carcass and belt structure and due to compression of the tread block elements. Since the tread surface is disposed at a radially outward position greater than that of the belt structure, rolling into contact with a flat surface causes a tangential stress to develop at the tire road interface in an advancing direction during approximately the first half of contact and in a retarding direction during approximately the second half of contact. For tires having block or block-type tread designs, a second set of stresses is generated due to the vertical compressive strain of the tread rubber induced by the vertical load applied to the inflated tire. This second set of stresses acts in an advancing sense at the transverse edge of the block first contacting the ground and in a retarding sense at the transverse edge of the block last contacting the ground. These transverse edges are referred to respectively as the leading edge 21 and trailing edge 22 of the block 20 shown in FIG. 3b. The two sets of stresses act simultaneously on the block surface with a resultant rate of tread rubber loss which can be non-uniform across the block surface. Specifically the rate of tread rubber loss is often a maximum at or near the trailing edge 22 of the block. The tread surface profile resulting from this non-uniform tread rubber loss is commonly known as a "heel-and-toe" "sawtooth" profile. In a later stage, such a tread surface profile can result in the rapid depression of some tread blocks relative to adjacent blocks and may necessitate premature removal of the tire from service.

In the present invention a sacrificial bridge is provided between tread blocks. The presence of the sacrificial bridge minimizes the undesirable "heel-and-toe" or "sawtooth" profile while at the same time maintaining acceptable traction performance. To achieve the above object according to the present invention, a radial pneumatic tire has a tread portion comprising: (a) a plurality of axially spaced apart essentially circumferential grooves having a depth h in the tread portion of the tire, and (b) at least one rib formed on the land portion between two of said circumferential grooves, and (c) a plurality of transverse grooves having a depth $h_1$ not exceeding the depth h of said circumferential grooves and arranged at circumferential intervals on at least one of the ribs, wherein alternating pairs of said transverse grooves define first land portions having a circumferential length $L_1$ circumferentially adjacent to second land portions having a circumferential length $L_2$, the ratio of the length $L_2$ of said second land portion to the length $L_1$ of said first land portion is such that $0.25:1 \leq L_2/L_1 \leq 0.50:1$, and (d) said second land portion is offset radially inward from said first land portion a distance d. By the proper specification of the ratio of the length of the sacrificial bridge to the length of the tread block and the depth and width of the cuts at the leading and trailing edges of the sacrificial bridge, the desired effect is maintained throughout the service life of the tread.

FIGS. 3a and 3b, 4a and 4b show various embodiments of the tire according to the present invention. In these embodiments a plurality of circumferential grooves 10 are arranged at regular axial intervals across the tread portion of the tire. The number and specific axial position of the circumferential grooves is determined according to the intended application of the tire. Circumferential grooves 10 have a depth h in the radial direction. A plurality of ribs is formed between adjacent circumferential grooves. In these embodiments, the ribs are divided in the transverse direction by a plurality of circumferentially spaced cuts 40 and 50. A first land portion, block 20, has a surface at the most radially outward position of the tread portion of the tire. Block 20 has a length $L_1$ in the circumferential direction, and a height h in the radial direction equal to the depth of the circumferential grooves 10. A second land portion, sacrificial bridge 30, has a surface 33 spaced radially inward from the surface of block 20 by a distance d. Surface 33 of sacrificial bridge 30 has a length $L_2$ measured in the circumferential direction. Cuts 40 and 50 have a depths $h_1$ measured radially inward from the tread surface and widths $w_1$ and $w_2$, respectively, measured in the tire circumferential direction. Cuts 40 and 50 are shown in the figures as straight radial cuts having equal depths $h_1$ although the invention encompasses cuts 40 and 50 having unequal depths or differing alternative shapes.

When a tire according to the present invention is mounted on a rim, inflated and loaded according to recommendations of the Tire and Rim Association, rolling the tire against the ground causes the above-mentioned sheer stresses to be generated on blocks 20. When sacrificial bridges 30 are present, compression of the tread rubber causes the radial walls of cuts 40 and 50 to approach each other so that sacrificial bridge 30 now acts to buttress the adjacent tread blocks 30 against the action of the aforementioned shear forces and thereby improve the uniformity of tread rubber loss across the surface of the block. Land portion 33 of sacrificial bridge 30 is also subjected to similar stress mechanisms. Due to the presence of cuts 40 and 50, the sacrificial bridge is free to undergo shear deformation and rubber loss such that the depression d is maintained. If the specific dimensions of sacrificial bridge 30, are such that the land portion has insufficient resistance to shear deformation, then the rate of rubber loss from bridge surface 33 will be less than the rate of rubber loss form block portion 20 In this case, depression d disappears after a low number of service miles and the ratio d/h approaches zero.

Figure 3A:
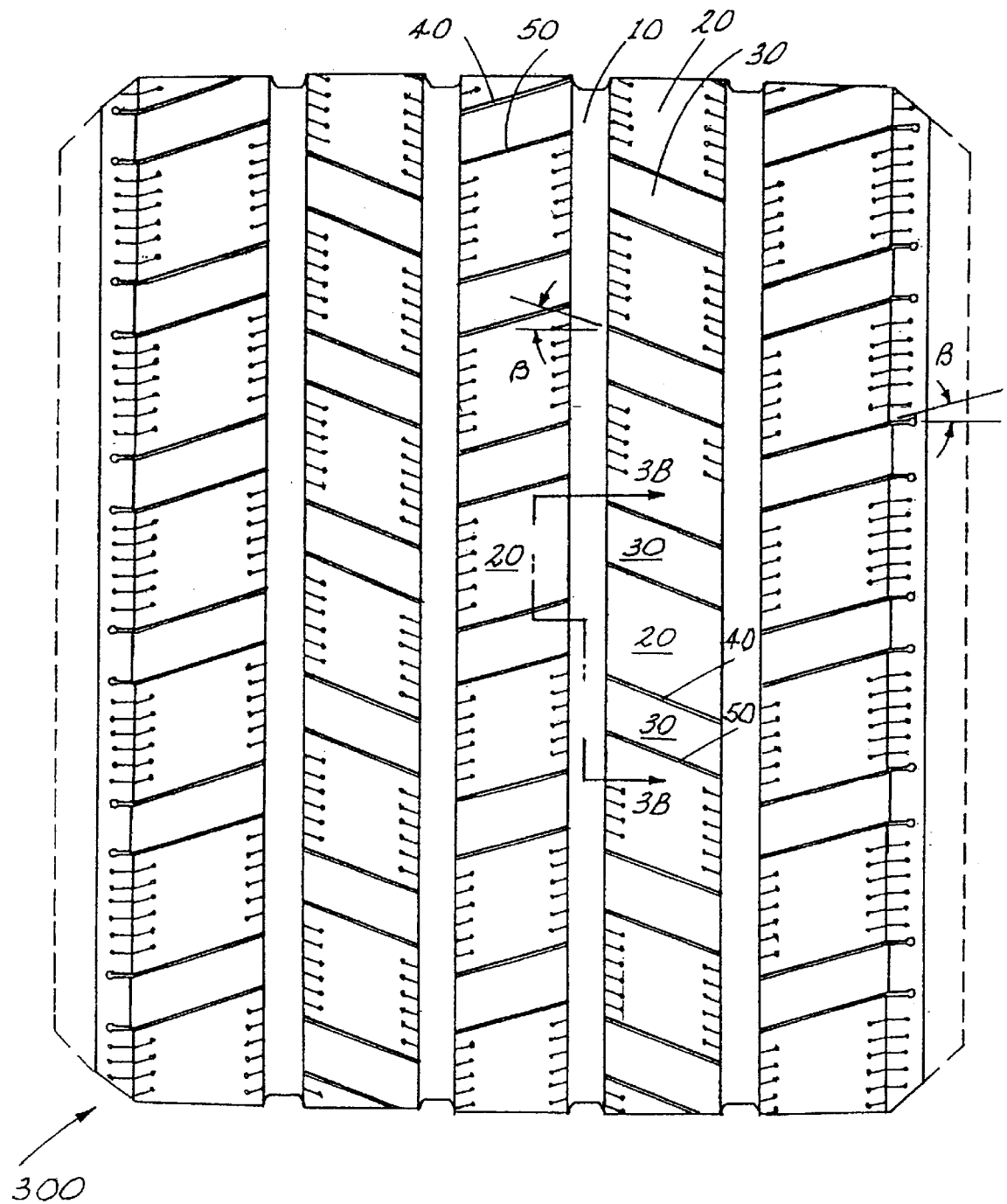
FIG. 3a is a plan view of the tread portion of a pneumatic radial tire 300 corresponding to a first embodiment of the invention.

FIG. 3a shows a first embodiment of the tire according to the invention. In this embodiment, blocks 20 are formed in the ribs between circumferential grooves with sacrificial bridges 30 being formed between the blocks 20 by radial narrow cuts 40 and 50. Sacrificial bridges 30 are located at regular circumferential intervals around the circumference of the tire. In FIG. 3a, blocks 20 are shown with a uniform length $L_1$. Typically length $L_1$ is between approximately 1.0% to 1.4% of the tire circumference although $L_1$ may have multiple discrete values so as to create a sequence of discrete block pitch lengths. Within the teachings of the invention, both the actual values of $L_1$ and the sequence of the discrete pitches are typically determined to minimize undesirable tire noise. Sacrificial bridges 30 are shown with straight edges 31 and 32 having an intersection angle β relative to the tire rolling direction as shown in FIG. 3a. Angle β is preferably in a range of about 60° to about 90°. The invention encompasses edges 31 and 32 which may take on alternative zigzag or curvilinear shapes.

EXAMPLE CASE

The invention disclosed herein can be advantageous for all classes of pneumatic tires where there is a need to improve the compromise between traction capabilities and overall service life. In order to demonstrate the improvements possible with the present invention, three different designs according to this first embodiment were prepared on 275/80 R 22.5 heavy duty truck radial tires and then were mounted on the drive axles of 6×4 heavy duty trucks operated under highway service conditions. Each design was mounted with a companion set of reference tires. During the course of the test, tread depths and tread surface profiles were measured as well as notations of the appearance of tread surface anomalies. The specifics of the three designs and the reference tire are shown in Table 1.

From the results of these tests, a tire according this embodiment could maintain an acceptable recess and thus d/h for up to 144,000 km (90,000 miles). The results shown in Table 1 clearly demonstrate that only certain combinations of the design parameters yield this level of performance. Between Embodiment 1-1 and Embodiment 1-2, all parameters have been held constant except the initial depression d. Nevertheless, the mileage to d/h~0 is essentially equivalent at 80,000 km (50,000 miles). Embodiment 1-3 exhibits superior performance of 144,000 km (90,000 miles). In this instance, the ratio $R_3=L_2/L_1$ has a value of 0.42:1.

The data show that an effective range for $R_3$ is $0.25:1 \leq L_2/L_1 \leq 0.50:1.$, and preferably $R_3$ should have a value greater than about 0.40:1 up to about 0.50:1. Values of $R_3$ less than 0.25:1 will yield a sacrificial bridge whose rate of rubber loss will be insufficient to show substantial improvement in maintaining the depression d. Conversely values of $R_3$ greater than 0.50:1 mean that the total surface area of blocks would be insufficient to provide adequate tractive forces or would produce an accelerated rate of tread rubber loss.

TABLE 1

Example Cases Using Embodiment 1

Figure 3B:
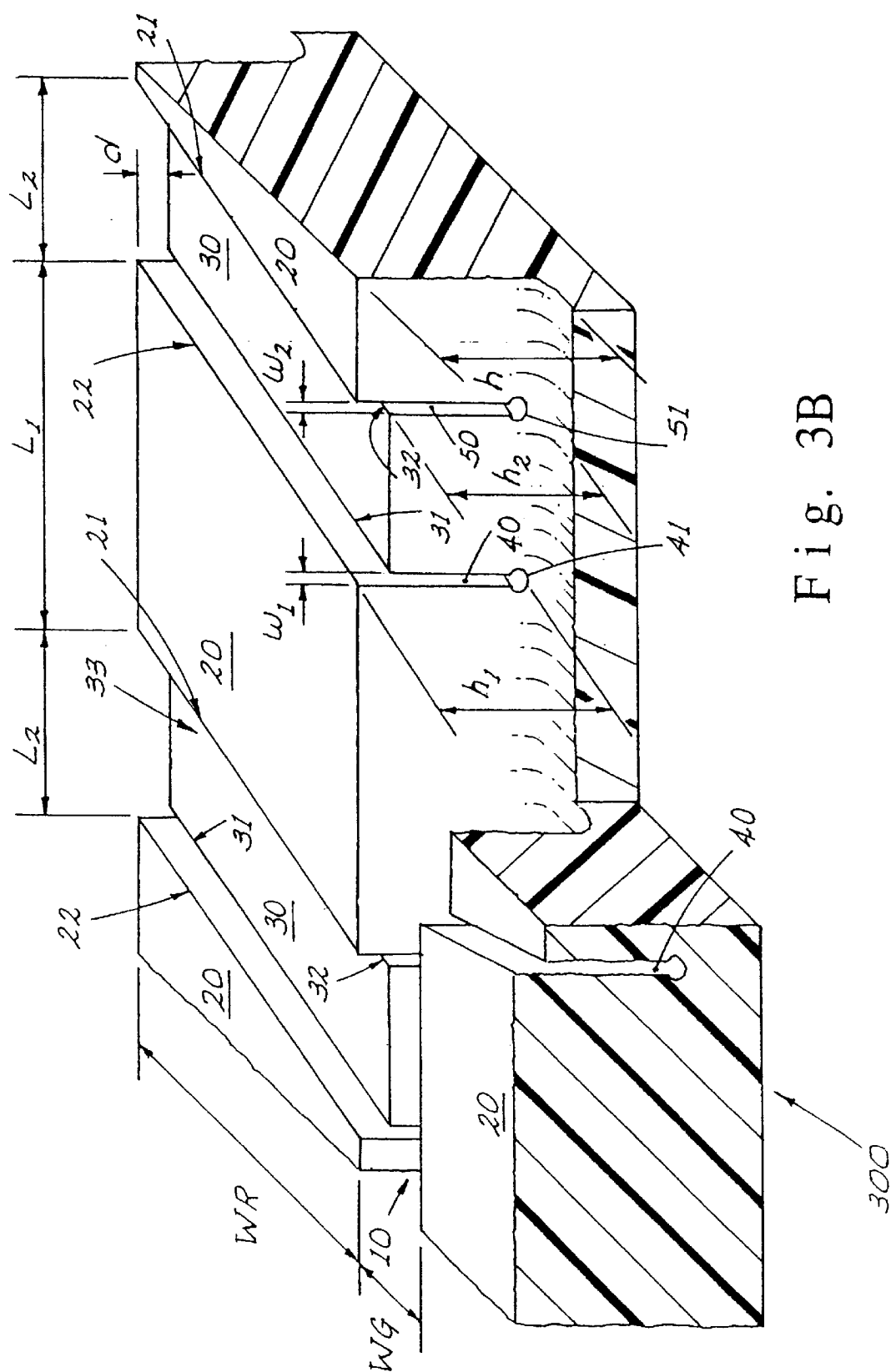
FIG. 3b is a cross-sectional view taken along the midline of the tread portion shown in FIG. 3a wherein the groove edge sipes have been removed for clarity.
Figure 3C:
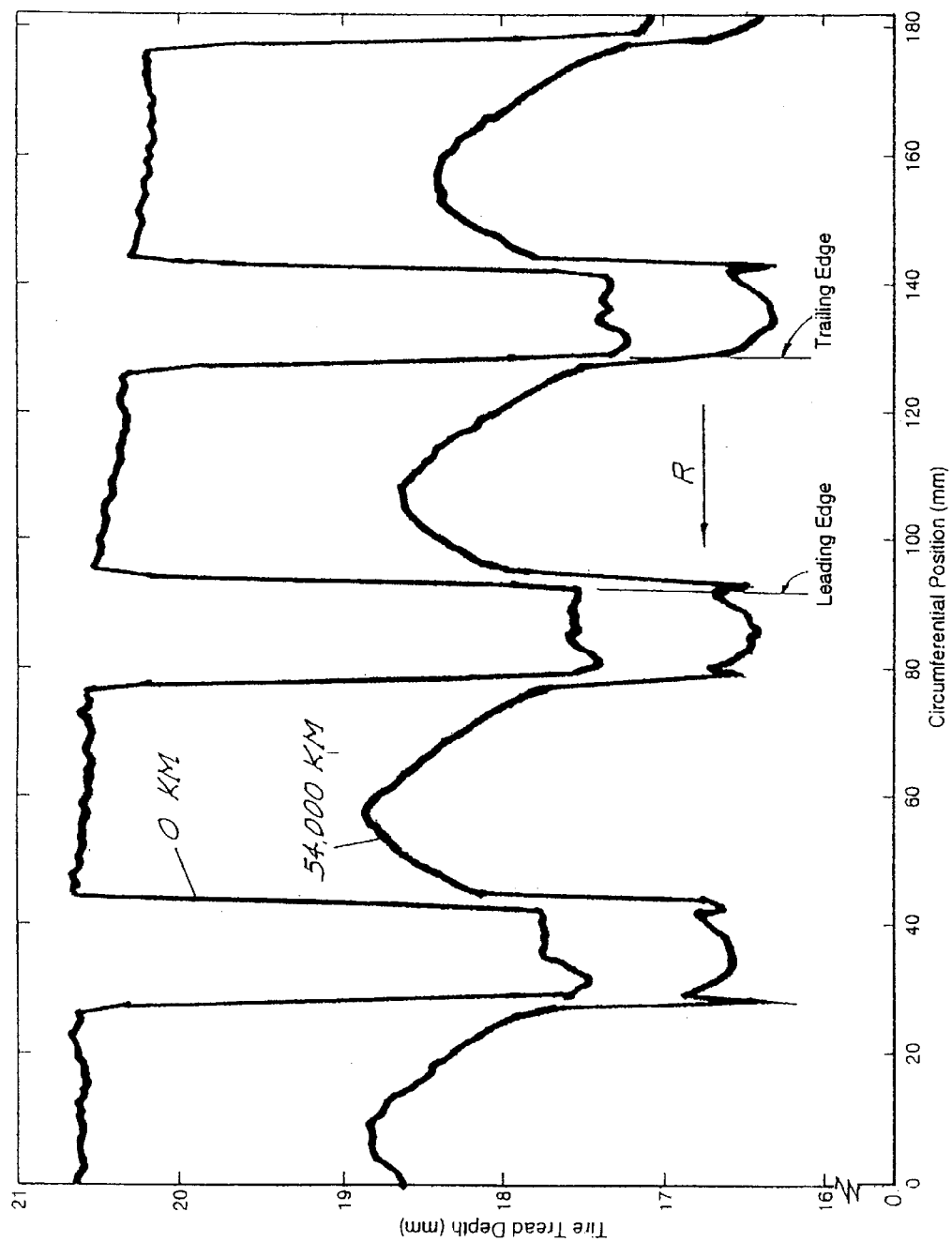
FIG. 3c is a graphical plot of the tread depth vs. circumferential position around a tire having the tread portion shown in FIG. 3a. Note: Direction of tire rotation indicated by the uppercase R.

| Design Parameters See Figure 3b | Tread Design | | | |
|---|---|---|---|---|
| | (Reference) | Embodiment 1-1 | Embodiment 1-2 | Embodiment 1-3 |
| Block Length $L_1$ (mm) | 45 | 42 | 42 | 38 |
| Bridge Length $L_2$ (mm) | 8 | 12 | 12 | 16 |
| Width of First Cut $w_1$ (mm) | N/A | 0.5 | 0.5 | 0.5 |
| Width of Second Cut $w_2$ (mm) | N/A | 0.5 | 0.5 | 0.5 |
| Initial Depression d (mm) | 3 | 2 | 3 | 3 |
| Tread Depth h (mm) | 20 | 20 | 20 | 20 |
| Cut Depth $h_1$ (mm) | N/A | 20 | 20 | 20 |
| Bridge Height $h_2$ (mm) | N/A | 18 | 17 | 17 |
| $R_1 = d/h$ | 0.15 | 0.10 | 0.15 | 0.15 |
| $R_2 = h_1/h$ | N/A | 1.00 | 1.00 | 1.00 |
| $R_3 = L_2/L_1$ | 0.18 | 0.29 | 0.29 | 0.42 |
| Distance to d/h ~ 0 (km) | 54,000 | 80,000 | 80,000 | 144,000 |

The ratio $R_1=d/h$ varies in the test cases between 0.10 to 0.15, and an effective range has been found to be $0.10:1 \leq R_1 \leq 0.20:1$. Preferably $R_1$ is approximately 0.15:1. In all examples shown in Table 1 the depth of cuts 40 and 50 is equal to the tread depth, h, or, alternatively $R_2=1.00:1$. However, habitual practice by users of heavy duty truck tires often leads to removal of a tire from service with some tread remaining. This allows cuts 40 and 50 to be less deep than the tread depth h, but, in all cases, maintenance of acceptable wet traction performance during actual service requires $h_1$ to be at least 75% of the tread depth h. This leads to a specification of $0.75 \leq R_2 \leq 1.00$ and, preferably that $R_2$ is approximately 1.00. The widths of cuts 40 and 50 are the same and equal to 0.5 mm in this embodiment. Widths $w_1$ and $w_2$ are effective in the range of about 0.2 mm to about 2 mm. Preferably, widths $w_1$ and $w_2$ are between about 0.5 mm to about 1 mm. Unfortunately, concentrated stresses at the bottom of narrow cuts 40 and 50 can produce cracking which can cause the early removal of the tire from service. To reduce this stress concentration, cuts 40 and 50 require a minimum radius at the bottom of the groove of about 1 mm.

As a means to reduce this stress concentration, cuts 40 and 50 as well as the groove edge siping are shown in the figures with an enlarged portion at their most radially inward extent.

Figure 2A:
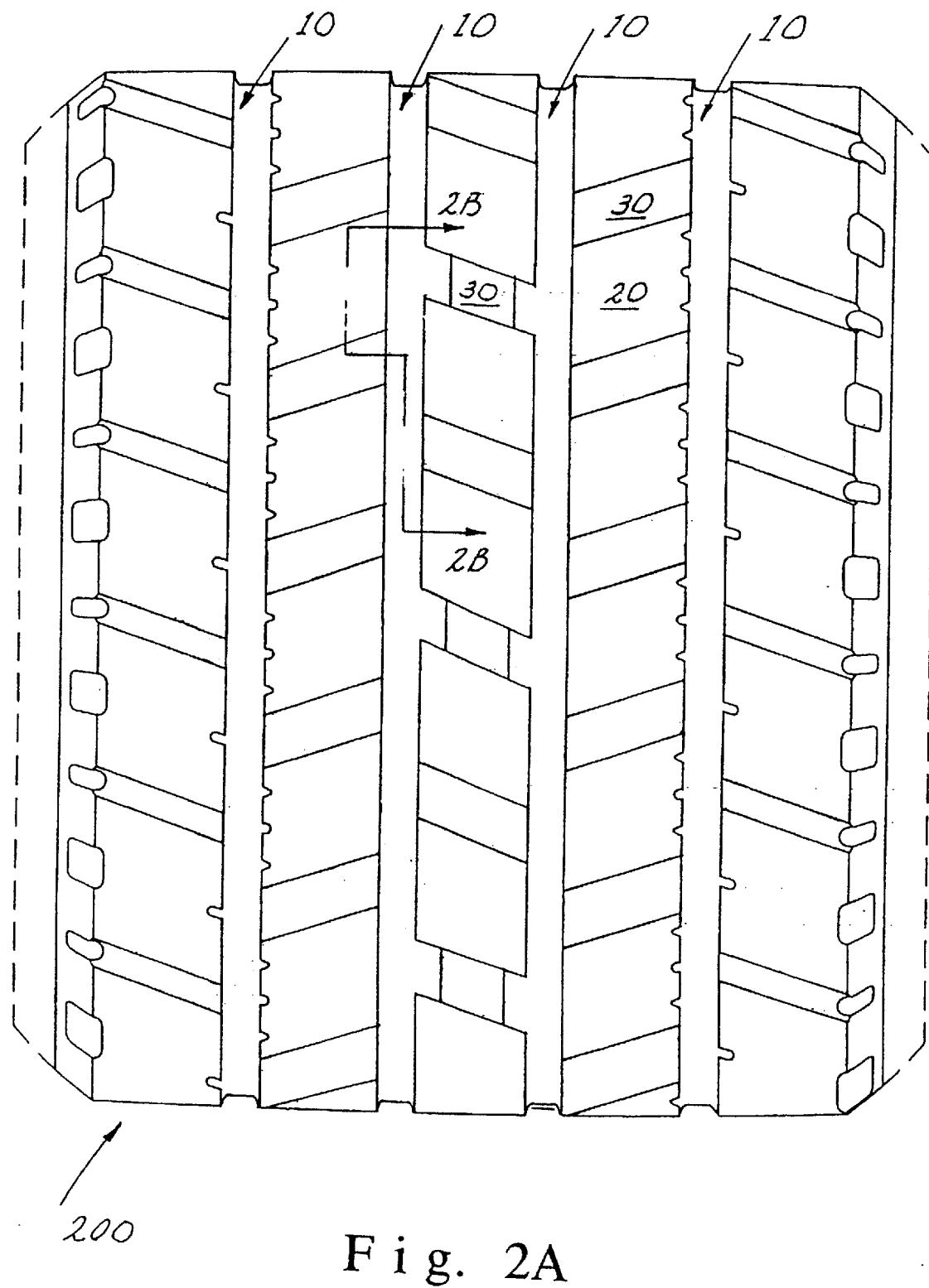
FIG. 2a is a plan view of the tread portion of a reference pneumatic radial tire 200 having partial depth transverse grooves.
Figure 2B:
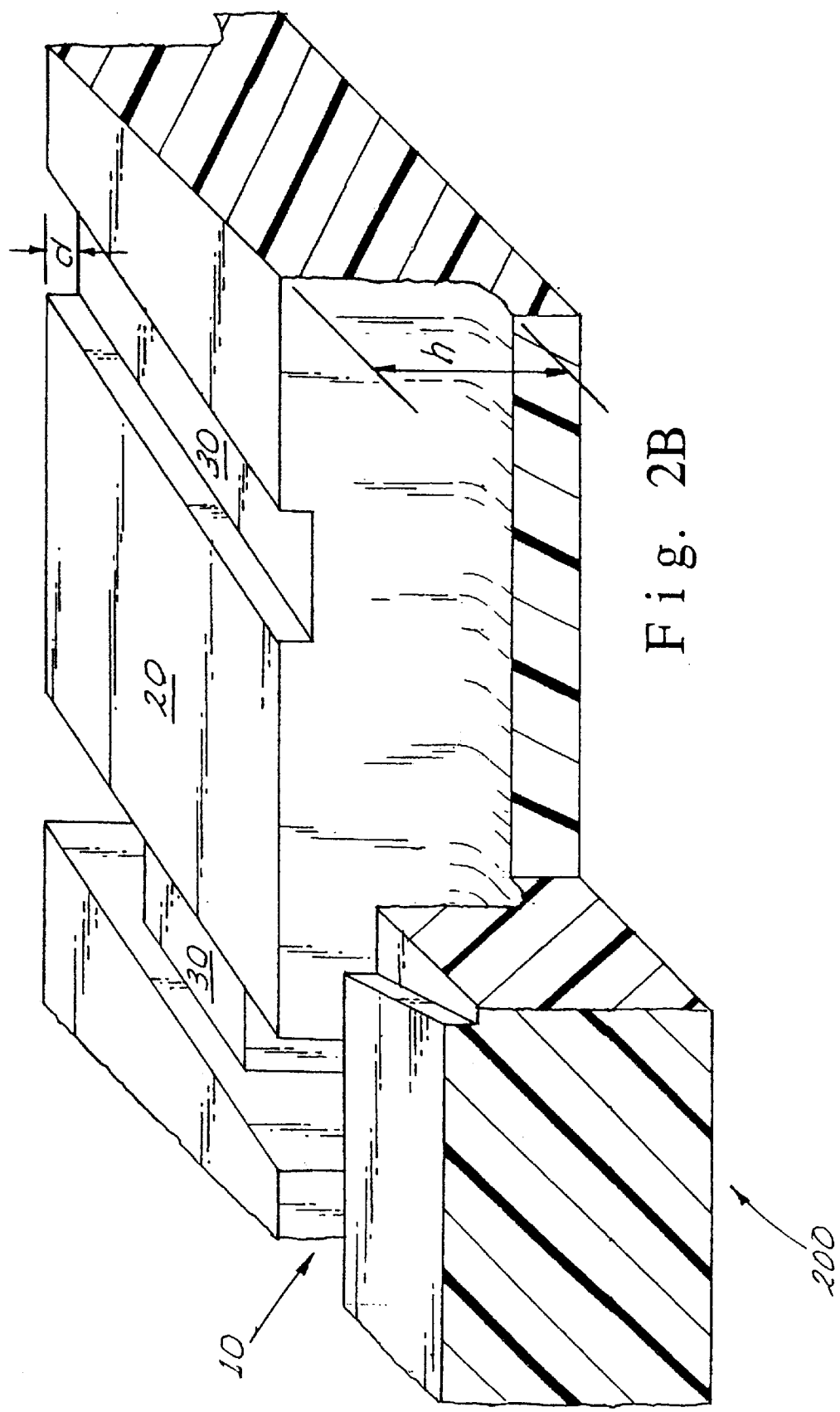
Figure 2C:
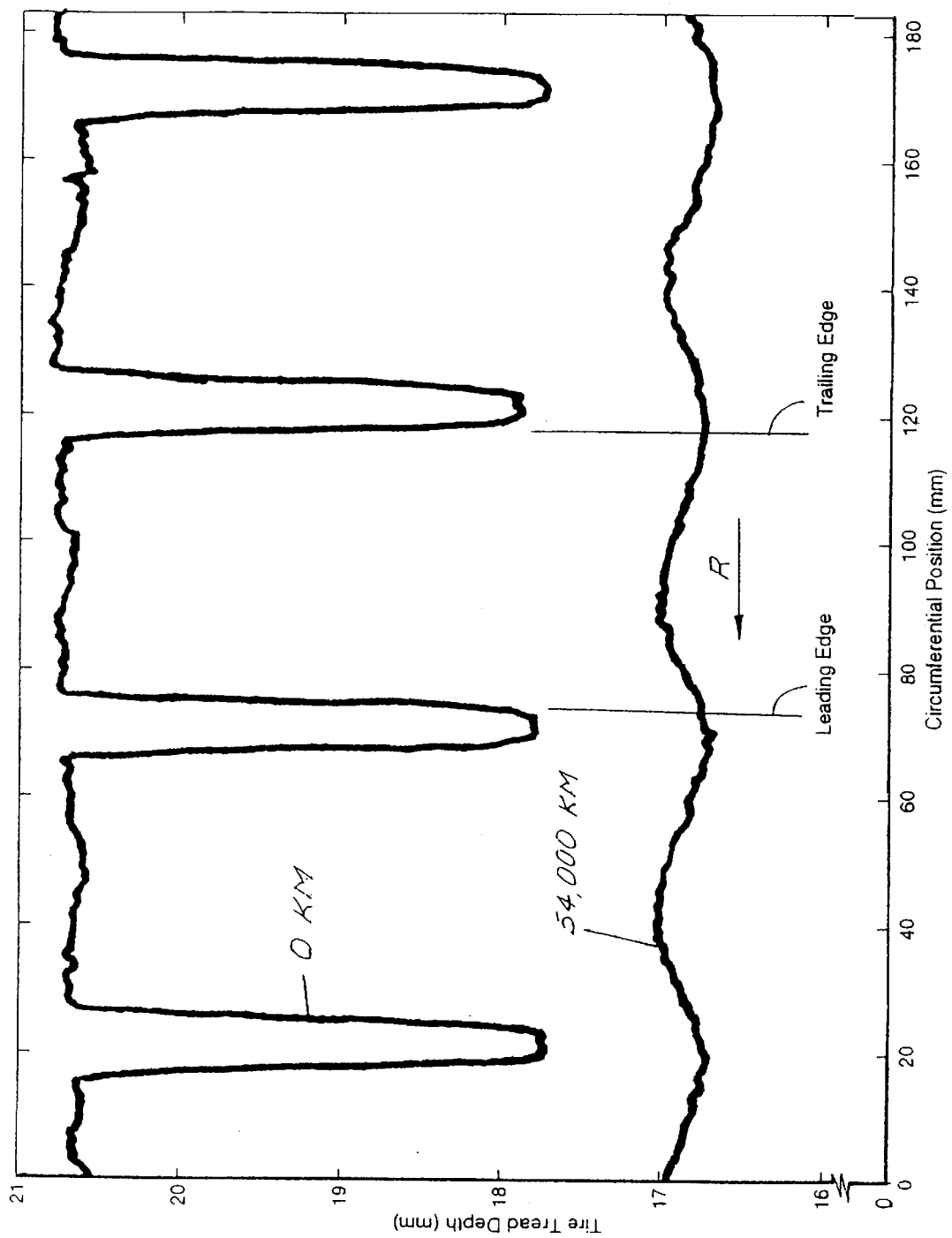

Results from vehicle tests such as those shown in Table 1 and in FIG. 2c indicate that the depression d is maintained well adjacent to the leading edge of block 30 but is considerably diminished adjacent to the trailing edge. In spite of the improved performance obtained by the presence of the sacrificial bridge, the tread rubber loss profile of block 20 exhibits a tendency for sawtooth shape. A way to obtain a desired improvement of a more uniform height of the block 20 throughout the service life of the tread is to incline at least one of the cuts 40 or 50 relative to the outward normal from the tread surface.

Figure 4A:
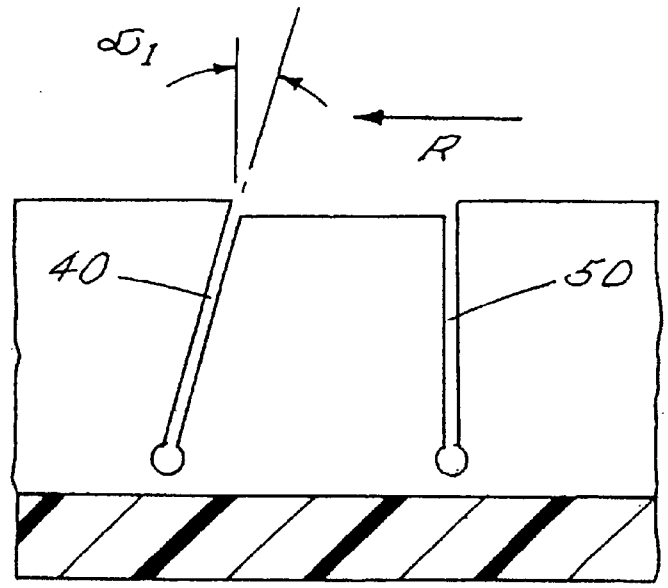
FIG. 4a and FIG. 4b are cross-sectional views of the tread portion of a pneumatic radial tire 300 showing possible configurations for inclined cuts. Note: Direction of tire rotation indicated by the uppercase R.
Figure 4B:
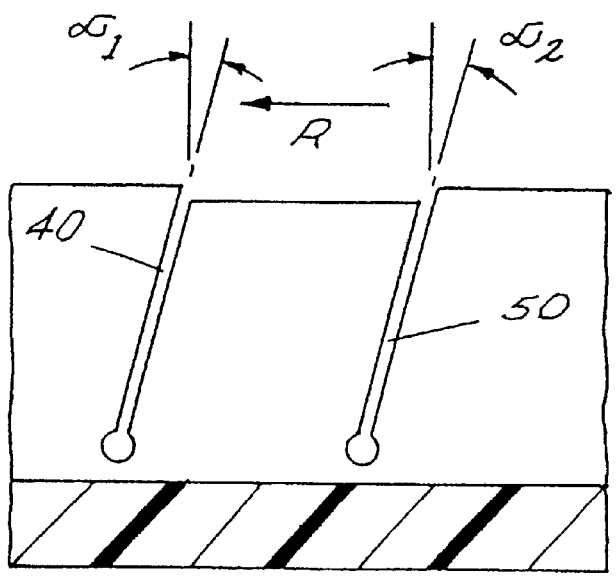

A second embodiment of the invention is shown in FIGS. 4a and 4b wherein cuts 40 and 50 may be inclined with respect to the outward normal from the tread surface. In these cases the axes of the cuts 40 and 50 have inclination angles $\alpha_1$ and $\alpha_2$, respectively, relative to the outward normal from the tread surface. Angle $\alpha$ is positive when the groove axis is rotated in the direction of tire rotation or counterclockwise as shown in FIGS. 4a and 4b. In the first example shown in FIG. 4a only cut 40 is inclined in the range $-15° \leq \alpha_1 \leq -5°$ and preferably $\alpha_1$ is between about $-7°$ to about $-10°$. In another example (not shown) only cut 50 is inclined in the range $-15° \leq \alpha_2 \leq -5°$ and preferably $\alpha_2$ is between about $-7°$ to about $-10°$. For the example shown in FIG. 4b, both cuts 40 and 50 are inclined and $\alpha_1$ and $\alpha_2$ have negative values. In the example of FIG. 4b, inclination of the grooves can be effective over a range $-15° \leq \alpha_1$ or $\alpha_2 \leq -5°$ and preferably both $\alpha_1$ and $\alpha_2$ are between about $-7°$ and about $-10°$. Inclination of cuts 40 and/or 50 causes the tire to be directional, that is, having a preferred direction of rotation. This is shown in FIGS. 4a and 4b by the uppercase R. It is also customary for this preferred direction of rotation to be indicated on the tire by an arrow or an advisory.

Figure 5A:
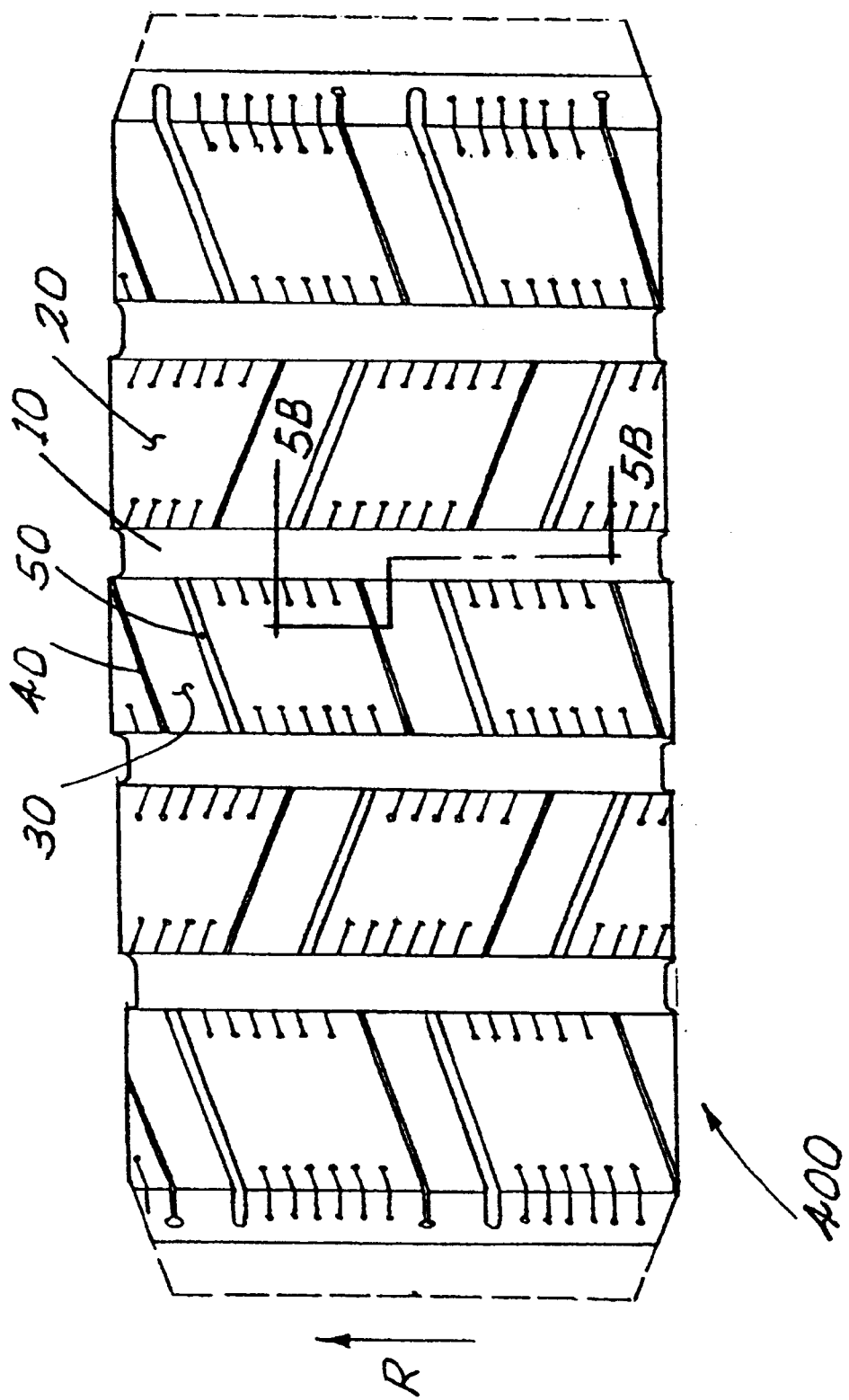
FIG. 5a is a plan view of the tread portion of a pneumatic radial tire 400 corresponding to a third embodiment of the invention.
Figure 5B:
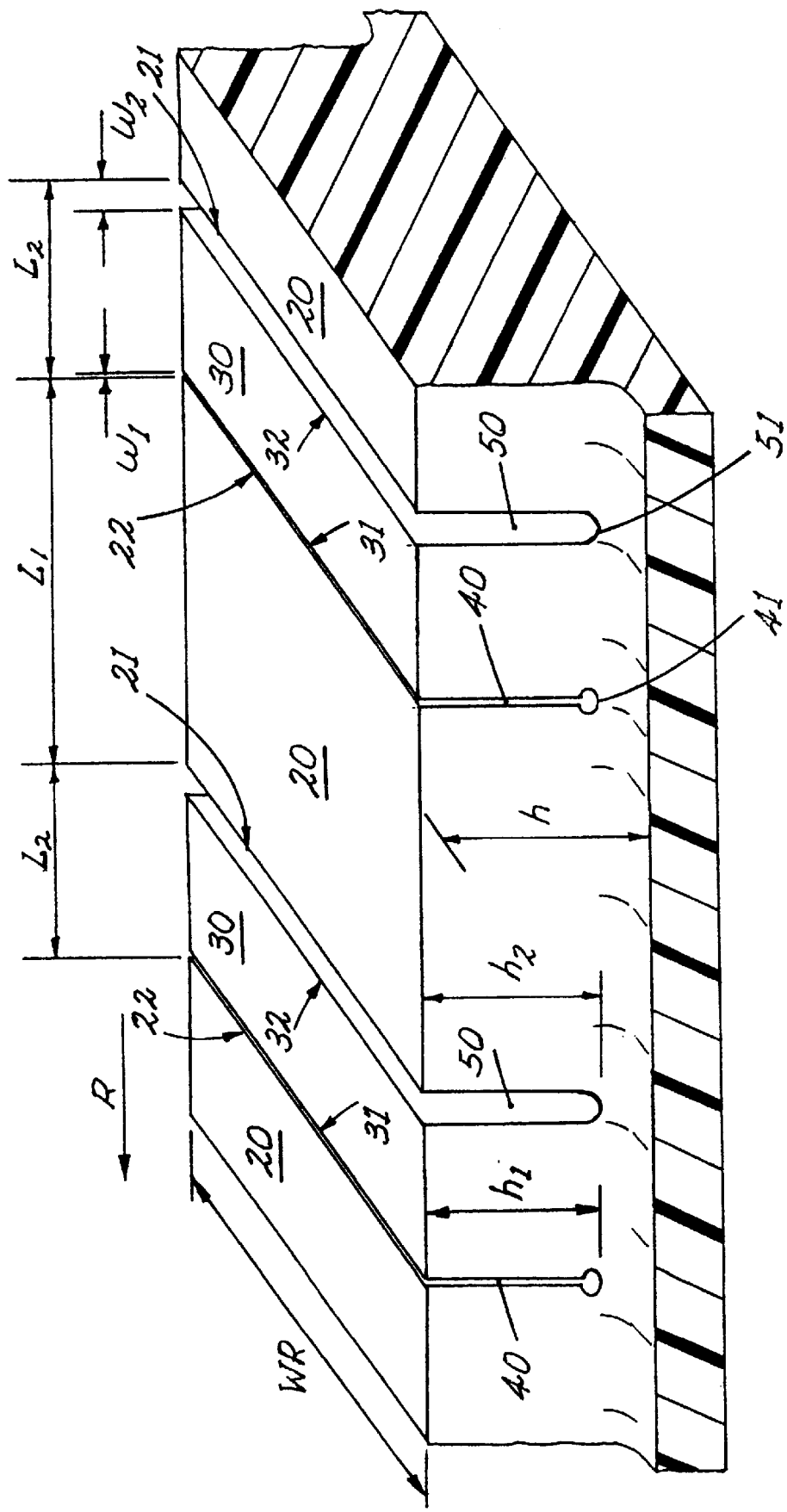
FIG. 5b is a partial perspective view of the tread portion of a pneumatic radial tire corresponding to a third embodiment of the invention.

In a third embodiment according to the invention, as shown for tire 400 in FIGS. 5a and 5b, increased sliding of the sacrificial bridge is accomplished by increasing the width of second cut 50 relative to the widths disclosed for the first embodiment. Another advantage of this embodiment is that increased sliding of the sacrificial bridge produces an accelerated initial rate of rubber loss from the sacrificial bridge. This permits the sacrificial bridge of the tread to initially have no depression (d/h=0), a potential advantage in further preventing the early appearance of tread surface anomalies, while thereafter developing a non-zero value of d/h. Thus both increased service life and traction on the used tire are obtained. It is not desirable to have an excessive amount of tread surface area as sacrificial regions for reasons of tire service life. Thus tire 400 has a narrow first cut 40 of width $w_1$ close to the trailing edge of a first block 30 increased width $w_2$ of second cut 50 close to the leading edge of a second block 30. For tread depths h of approximately 20 mm, the width $w_2$ of cut 50 can be approximately 1 mm to 10 mm. Increasing the width of cut 50 reduces the rigidity of the entire tread and can adversely affect the rate of tread rubber loss. As a result it is preferable to maintain width of cut 50 in the range $1 \text{ mm} \leq w_2 \leq 3 \text{ mm}$. Increasing the width of cut 50 now allows the sacrificial bridge 30 to develop and to maintain its depression longer into the life of the tire. Width $w_1$ of narrow cut 40 remains preferably in the range of 0.2 mm to 1 mm.

Figure 6A:
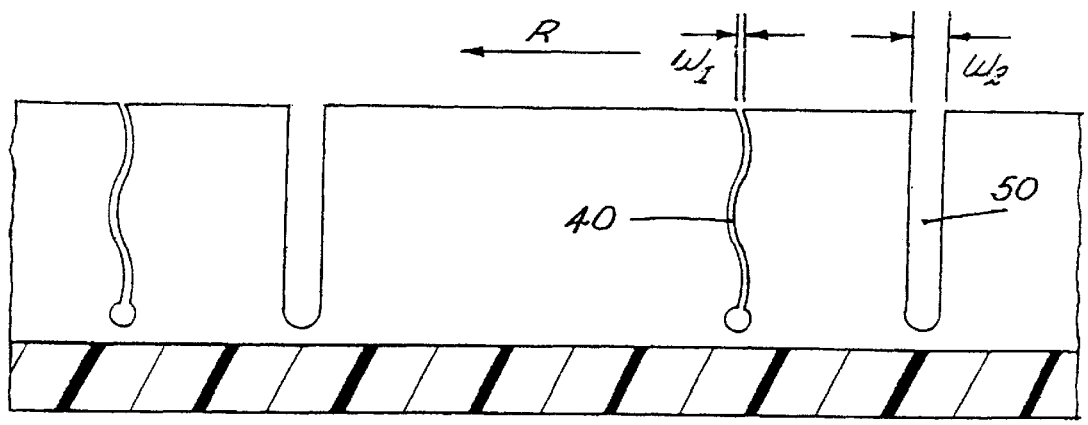
FIG. 6a is a cross-sectional view taken along the midline of the tread portion shown in FIG. 5a showing a first cut of zigzag profile.
Figure 6B:
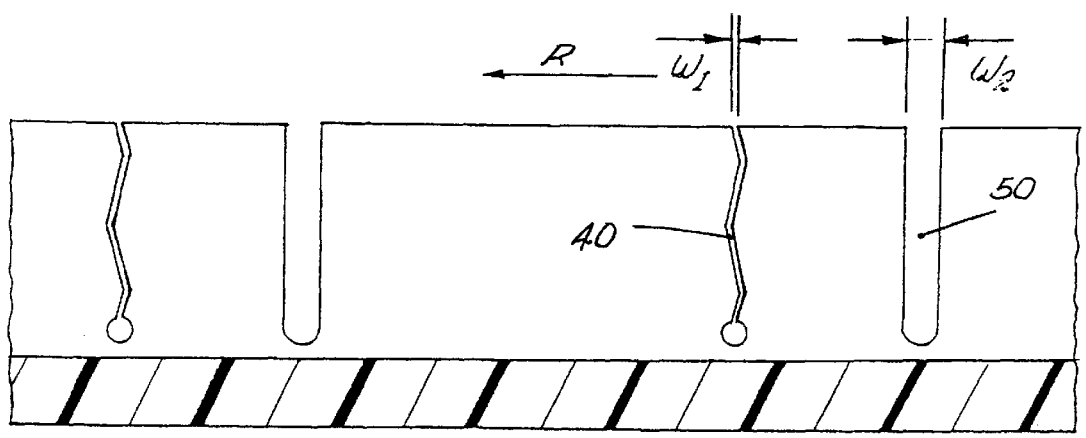
FIG. 6b is a cross-sectional view taken along the midline of the tread portion shown in FIG. 5a showing a first cut of sinusoidal profile

An important function of the sacrificial bridge is to reduce shear stress generated by compressive loading of the block 30. In the third embodiment just described, enlarged second cut 50 reduces the buttressing effect of the sacrificial bridge which leads to a loss of rigidity at the trailing edge 22 of block 30. It is advantageous to regain some of this lost rigidity by a form of first cut 40 which "locks" the trailing edge 22 of block 30 to the leading edge 31 of sacrificial bridge 30. This can be accomplished with a first cut 40 having a zigzag as shown in FIG. 6a, sinusoidal as shown in FIG. 6b or similar undulated form in the radial direction. A significant level of undulation is required to obtain the locking effect, preferably an undulation amplitude of 4–8 mm with at least one cycle of undulation within the dimension h of the tread. Since, in this embodiment, the sacrificial rib expected to undergo larger shear deformations than for the previous embodiment, the narrow cut 40 may experience cracking of the rubber at the bottom of cut 40 due to both localized stress concentrations and to increased shear deformation. To protect the tire from this adverse situation, the cut 40 is formed with an enlarged section at the bottom of approximately two to five times larger than the width $w_1$. Whereas it is preferred in this embodiment for the depression d to be initially zero, non-zero initial values as disclosed for the first embodiment are also acceptable. Thus the ratio $R_1$ will now be $0 \leq R_1 \leq 0.20:1$ which for h=20 mm specifies $0 \leq d \leq 4$ mm with d preferably equal to zero on the new tire.

Figure 7A:
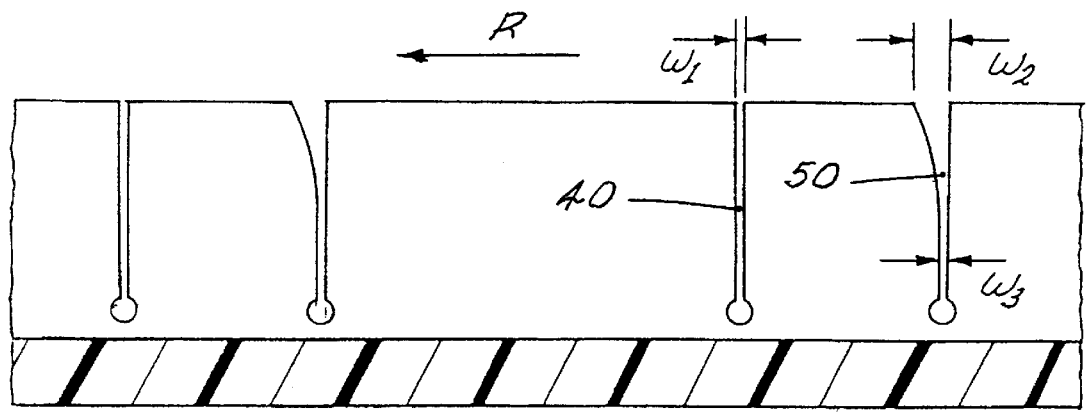
FIG. 7a is a cross-sectional view taken along the midline of the tread portion shown in FIG. 5a showing a second cut having a curvilinear profile
Figure 7B:
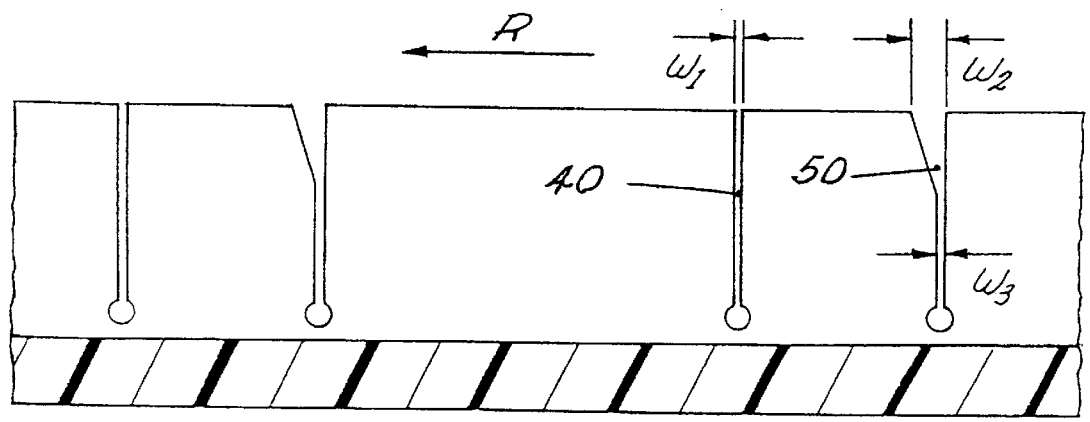
FIG. 7b is a cross-sectional view taken along the midline of the tread portion shown in FIG. 5a showing a second cut having a chamfered profile

FIG. 7a shows another example of the third embodiment of the invention where the second cut 50 has a continuously variable width from tread surface to the bottom of cut 50. In this case $w_2$ is measured at the most radially outward location. The shape shown in FIG. 7a is curvilinear, so that at approximately half tread depth, the width of cut 50 is substantially equal to the width of the narrow cut 40. In this manner the buttressing effect of the sacrificial bridge is restored, but the depression d and a favorable value of $R_1$ are maintained during the life of the tire. An alternative form for cut 50 is shown in FIG. 7b where the cut follows a substantially straight line taper from the tread surface to a point radially inward and located at approximately half tread depth. From this transition point to the bottom 51, the width is substantially constant and is preferably equivalent to that specified for the narrow cut 40. In both examples shown in FIGS. 7a and 7b, an enlargement 51 at the base of the cut is preferred to prevent stress crack formation. Further resistance to the formation of surface anomalies can be obtained by inclination of either or both first cut 40 and second cut 50 as described herein for the second embodiment of the invention. In this instance the dispositions of inclined cuts shown in FIG. 4a and FIG. 4b also applies to the third embodiment.

What is claimed:

1. A tire having a tread portion comprising:
   (a) a plurality of axially spaced apart essentially circumferential grooves having a depth h in the tread portion of the tire, and
   (b) at least one rib formed by the land portion between two of said circumferential grooves, and
   (c) a plurality of narrow transverse grooves having a depth $h_1$ not exceeding the depth h of said circumferential grooves and arranged at circumferential intervals on at least one of said ribs, wherein alternating pairs of said transverse grooves define first land portions having a circumferential length $L_1$ circumferentially adjacent to second land portions having a circumferential length $L_2$, the ratio of the length $L_2$ of said second land portion to the length $L_1$ of said first land portion is such that $0.25:1 \leq L_2/L_1 \leq 0.50:1$, and
   (d) a first of said pair of narrow transverse grooves disposed at a leading edge of said second land portion having a width $w_1$ and a depth $h_1$, and a second of said pair of narrow transverse grooves disposed at a trailing edge of said second land portion having a width $w_2$ and a depth $h_2$, wherein the width $w_1$ of said first narrow groove is about 0.2 mm to about 1 mm and the width $w_2$ of said second narrow groove is about 3 mm to about 10 mm.

2. The tire according to claim 1, wherein a said depths $h_1$ and $h_2$ are substantially equal.

3. The tire according to claim 1, wherein the width $w_1$ of said first narrow groove is about 0.5 mm.

4. The tire according to claim 1, wherein said first narrow groove has an undulated cross-sectional form in the tire circumferential direction, said undulated form having an amplitude of about 4 mm to about 8 mm and having at least one cycle of undulation.

5. The tire according to claim 1, wherein said second narrow grove has a continuously variable groove width, said width having a maximum value at a radial location coincident with the tread surface, and a minimum value at a radially inward distance approximately equal to said depth $h_2$ of said second narrow groove.

6. The tire according to claim 1, wherein said second narrow groove width is comprised of a first variable width section, said first section extending radially inward from said tread surface a distance approximately half said second narrow groove depth and having a maximum width at said tread surface and a minimum width at the radially inwardmost extent of said first section, and a second section of constant width equal to said minimum width and extending from the radially inwardmost extent of said first section to the radially inward extent of said second narrow groove.

7. The tire according to claim 1, wherein said first narrow groove has an angle of inclination relative to the radially outward direction of about −5° to about −15°.

8. The tire according to claim 1, wherein said second narrow has an angle of inclination relative to the radially outward direction of about −5° to about −15°.

9. The tire according to claim 1, wherein said first narrow groove has an angle of inclination relative to the radially outward direction of about −5° to about −15°, and said second narrow groove has an angle of inclination relative to the radially outward direction of about −5° to about −15°.

10. The tire according to claim 1 wherein both first and second narrow grooves have an angle of inclination relative to the radially outward direction of about −7° to about 10°.

\* \* \* \* \*